(12) United States Patent
Zhang et al.

(10) Patent No.: US 11,139,471 B2
(45) Date of Patent: Oct. 5, 2021

(54) LITHIUM ION BATTERY

(71) Applicant: Contemporary Amperex Technology Co., Limited, Ningde (CN)

(72) Inventors: Ming Zhang, Ningde (CN); Hao Zhang, Ningde (CN); Cuiping Zhang, Ningde (CN); Changlong Han, Ningde (CN); Chenghua Fu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 194 days.

(21) Appl. No.: 16/415,043

(22) Filed: May 17, 2019

(65) Prior Publication Data

US 2019/0355983 A1    Nov. 21, 2019

(30) Foreign Application Priority Data

May 17, 2018    (CN) .......................... 201810474538.4

(51) Int. Cl.
*H01M 4/60* (2006.01)
*H01M 4/36* (2006.01)
(Continued)

(52) U.S. Cl.
CPC ........... *H01M 4/366* (2013.01); *H01M 4/131* (2013.01); *H01M 4/485* (2013.01); *H01M 4/60* (2013.01);
(Continued)

(58) Field of Classification Search
CPC ...... H01M 4/366; H01M 4/131; H01M 4/485; H01M 4/60; H01M 10/0525; H01M 2004/0028
See application file for complete search history.

(56) References Cited

U.S. PATENT DOCUMENTS 9,209,482 B2 * 12/2015 Chu ...................... H01M 4/525
2002/0071991 A1 * 6/2002 Kweon ................. H01M 4/525
                                                                429/231.1
(Continued)

FOREIGN PATENT DOCUMENTS

CN    105098242 A    11/2015
CN    106450270 A    2/2017
(Continued)

OTHER PUBLICATIONS

Extended European Search Report dated Aug. 21, 2019 related to corresponding European Patent Application No. 19175039.7.

*Primary Examiner* — Jane J Rhee
(74) *Attorney, Agent, or Firm* — Tucker Ellis LLP

(57) ABSTRACT

The present disclosure provides a lithium ion battery including a positive electrode plate, a negative electrode plate, a separator, and an electrolyte. The positive electrode plate includes a positive electrode current collector, and a positive electrode film disposed on a surface of the positive electrode current collector and containing a positive electrode active material. The positive electrode active material includes a matrix, a first coating layer on the matrix in form of discrete islands, and a second coating layer on the first coating layer and the matrix as a continuous layer. The electrolyte includes an additive A and an additive B. The additive A is (Continued)

selected from a group consisting of cyclic sulfate compounds represented by Formula 1 and Formula 2, and combinations thereof, and the additive B is one or two selected from lithium difluorobisoxalate phosphate and lithium tetrafluorooxalate phosphate.

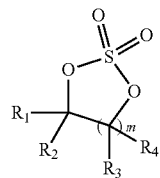

Formula 1

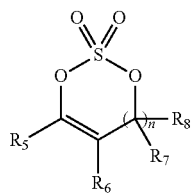

Formula 2

10 Claims, 2 Drawing Sheets

(51) Int. Cl.
H01M 4/131 (2010.01)
H01M 4/485 (2010.01)
H01M 10/0525 (2010.01)
H01M 4/02 (2006.01)

(52) U.S. Cl.
CPC .. *H01M 10/0525* (2013.01); *H01M 2004/028* (2013.01)

(56) References Cited

U.S. PATENT DOCUMENTS

2016/0064775 A1* 3/2016 Kako ............... H01M 4/505 429/199
2016/0118648 A1* 4/2016 Gunji ............ H01M 10/052 429/223
2016/0329613 A1* 11/2016 Kusachi .......... H01M 10/0585

FOREIGN PATENT DOCUMENTS

| EP | 3333962 A1 | 6/2018 |
| JP | 2015056312 A | 3/2015 |
| KR | 20160002314 A | 1/2016 |
| WO | 17/026181 A1 | 2/2017 |

* cited by examiner

LITHIUM ION BATTERY

CROSS-REFERENCE TO RELATED APPLICATIONS

The present application claims priority to Chinese Patent Application No. 201810474538.4, filed on May 17, 2018, the content of which is incorporated herein by reference in its entirety.

TECHNICAL FIELD

The present disclosure relates to the technical field of battery, and in particular, to a lithium ion battery.

BACKGROUND

Lithium ion batteries have been broadly applied in the field of electric vehicles, due to their advantages such as high energy density, long cycle life, no pollution, etc. In order to meet consumers' demand for endurance mileage of the electric vehicles, it is an effective solution to develop a positive electrode active material with a high specific capacity.

Currently, a lithium nickel cobalt manganese ternary material has become a research focus because of its high theoretical specific capacity and security property. However, the lithium nickel cobalt manganese ternary material has a strong oxidizability due to its high nickel metal content, such that the electrolyte is likely to result in an electrochemical oxidation reaction on a surface of the positive electrode as well as a structural change of the lithium nickel cobalt manganese ternary material. As result, transition metals, such as nickel and cobalt, can be de-intercalated due to a reduction reaction, causing deterioration of an electrochemical performance of the lithium ion battery, particularly a significant deterioration of the performance at high temperature. In addition, since an excess amount of lithium salt must be added during the preparation of the ternary material to compensate for the lithium loss during a sintering process, there is always a small amount of Li remained on the surface of the prepared positive electrode active material, which the small amount of Li is present in a form of $Li_2O$ at high temperature, and absorbs $CO_2$ and $H_2O$ in the air to form residual lithium materials such as LiOH and $Li_2CO_3$ once the temperature drops to room temperature. The presence of the residual lithium materials aggravates a gas production of the lithium ion battery and deteriorates the storage performance. The lithium nickel cobalt manganese ternary material, which is generally present in form of secondary particles formed by agglomeration of primary particles, has a poor compressive strength, and thus its specific surface area will be significantly increased after the positive electrode active material is crushed, which increases the contact area with the electrolyte, thereby further intensifying the gas production problem of the lithium ion battery.

As regard to the application in electric vehicles, the lithium ion batteries are required to have a longer cycle life and a longer storage life so as to ensure a longer endurance mileage. In addition, the lithium ion batteries are also required to have a low internal resistance during the long-term cycling and storage process, in order to ensure a stable acceleration performance and power performance of the lithium ion batteries.

SUMMARY

In view of the problems in the related art, an object of the present disclosure is to provide a lithium ion battery, which has reduced gas production, prolonged cycle life and storage life, and in which an increase in a direct current resistance (DCR) during cycling and storage is also significantly inhibited.

The present disclosure is to provide a lithium ion battery, including a positive electrode plate, a negative electrode plate, a separator disposed between the positive electrode plate and the negative electrode plate, and an electrolyte including a lithium salt and an organic solvent. The positive electrode plate includes a positive electrode current collector, and a positive electrode film disposed on a surface of the positive electrode current collector and containing a positive electrode active material. The positive electrode active material includes a matrix, a first coating layer coated on a surface of the matrix in form of discrete islands, and a second coating layer coated on the first coating layer and the surface of the matrix in form of a continuous layer. The matrix having a general formula of $Li_xNi_yCo_zM_kMe_pO_rA_m$, where $0.95 \le x \le 1.05$, $0 \le y \le 1$, $0 \le z \le 1$, $0 \le k \le 1$, $0 \le p \le 0.1$, $y+z+k+p=1$, $1 \le r \le 2$, $0 \le m \le 2$, $m+r \le 2$, M is one or two selected from Mn and Al, Me is selected from a group consisting of Zr, Zn, Cu, Cr, Mg, Fe, V, Ti, Y, Nb, and combinations thereof, and A is selected from a group consisting of N, F, S, Cl, and combinations thereof. The first coating layer is an oxide of a metal element N, and the metal element N is selected from a group consisting of Al, Zr, Mg, Ti, Co, Y, Ba, Cd, and combinations thereof. The second coating layer is an oxide of element N', and the element N' is selected from a group consisting of B, Sn, S, P, and combinations thereof. The electrolyte further comprises an additive A and an additive B. The additive A is selected from a group consisting of cyclic sulfate compounds represented by Formula 1 and Formula 2, and combinations thereof. In Formula 1 and Formula 2, m is an integer selected from 1 to 3, n is an integer selected from 0 to 3, and $R_1$, $R_2$, $R_3$, $R_4$, $R_5$, $R_6$, $R_7$, and $R_8$ are each independently selected from a group consisting of hydrogen, halogen, cyano, carboxyl, sulfonyl, $C_1$-$C_{20}$ alkyl, $C_1$-$C_{20}$ halogenated alkyl, $C_2$-$C_{20}$ unsaturated hydrocarbyl, and $C_2$-$C_{20}$ halogenated unsaturated hydrocarbyl. The additive B is one or two selected from lithium difluorobisoxalate phosphate and lithium tetrafluorooxalate phosphate,

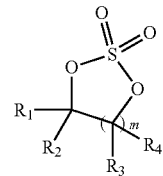

Formula 1

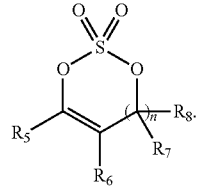

Formula 2

Compared with the common technologies, the present disclosure has at least the following beneficial effects.

In the lithium ion battery of the present disclosure, the positive electrode active material can effectively reduce the amount of the gas production of the lithium ion battery. The combinational use of additive A and the additive B in the electrolyte can facilitate the formation of a dense and strong composite film on the surface of the positive electrode, which is composed of a polymer film mainly containing a lithium sulfate (ROSO$_3$Li) and an inorganic lithium salt containing characteristic elements such as P and F. The composite film reduces the activity of the positive electrode active material, blocks the contact between the positive electrode active material and the electrolyte, and inhibits oxidative decomposition of the electrolyte, such that the lithium ion battery has more excellent cycle life and storage life. In the meantime, the inorganic lithium salt containing characteristic elements such as P and F, which is formed through oxidation of the additive B, can effectively maintain an unimpeded diffusion channel of lithium ions during cycling and storage. Therefore, the increase in the direct current resistance (DCR) of the lithium ion battery during cycling and storage can be significantly inhibited, and the power performance of the lithium-ion battery can be improved.

DESCRIPTION OF EMBODIMENTS

Figure 1:
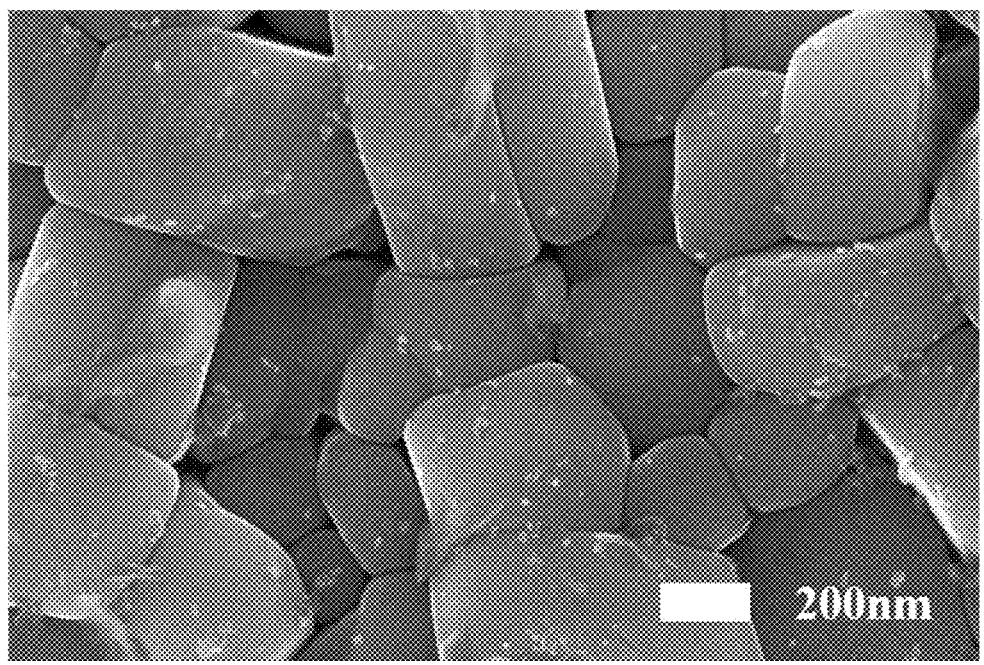
FIG. 1 and FIG. 2 are SEM images of a positive electrode active material obtained in Embodiment 1 according to the present disclosure, in which a magnification of FIG. 1 is 50,000 times and a magnification of FIG. 2 is 5000 times.

The lithium ion battery according to the present disclosure is described in detail below.

The lithium ion battery provided by the present disclosure includes a positive electrode plate, a negative electrode plate, a separator disposed between the positive electrode plate and the negative electrode plate, and an electrolyte.

In an embodiment of the lithium ion battery of the present disclosure, the positive electrode plate includes a positive electrode current collector, and a positive electrode film disposed on a surface of the positive electrode current collector and containing a positive electrode active material. The positive electrode active material includes a matrix, a first coating layer coated on a surface of the matrix in form of discrete islands, and a second coating layer coated on the first coating layer and the surface of the matrix in form of a continuous layer. The matrix has a general formula of Li$_x$Ni$_y$Co$_z$M$_k$Me$_p$O$_r$A$_m$, where 0.95≤x≤1.05, 0≤y≤1, 0≤z≤1, 0≤k≤1, 0≤p≤0.1, y+z+k+p=1, 1≤r≤2, 0≤m≤2, m+r≤2, M is one or two selected from Mn and Al, Me is selected from a group consisting of Zr, Zn, Cu, Cr, Mg, Fe, V, Ti, Y, Nb, and combinations thereof, and A is selected from a group consisting of N, F, S, Cl, and combinations thereof. The first coating layer is an oxide of metal element N, and the metal element N is selected from a group consisting of Al, Zr, Mg, Ti, Co, Y, Ba, Cd, and combinations thereof. The second coating layer is an oxide of element N', and the element N' is selected from a group consisting of B, Sn, S, P, and combinations thereof.

In the lithium ion battery of the present disclosure, the positive electrode active material has a low content of residual lithium on the surface of the matrix, so that the gas production caused by the residual lithium can be effectively reduced. Because of the two coating layers on the surface of the matrix of the positive electrode active material, the positive electrode active material also has a high surface structure stability, which can effectively prevent a direct contact between the matrix and the electrolyte and reduce the side reactions between the matrix and the electrolyte, and thus avoids a large amount of gas production caused by the side reactions. The second coating layer, in form of a dense and continuous layer, is evenly coated on the surface of the matrix and the first coating layer, thereby effectively reducing a surface roughness and the specific surface area of the positive electrode active material. In this way, the effective contact area between the electrolyte and the surface of the positive electrode active material can be decreased, and thus the side reactions between the surface of the positive electrode active material and the electrolyte can be reduced, avoiding the large amount of gas production caused by the side reactions. Therefore, the positive electrode active material of the present disclosure can effectively reduce the amount of gas production of the lithium ion battery.

In the lithium ion battery of the present disclosure, the matrix of the positive electrode active material is present in form of secondary particles, which are formed by agglomeration of primary particles.

In the lithium ion battery of the present disclosure, the first coating layer and the second coating layer are located on surfaces of the primary particles of the matrix of the positive electrode active material. Preferably, the first coating layer and the second coating layer are located on surfaces of the primary particles that constitute the outermost layer of the matrix, which is present is in form of secondary particles. Further preferably, the first coating layer and the second coating layer are located on surfaces of the primary particles that constitute the outermost layer of the matrix, which is present is in form of secondary particles, as well as on surfaces of at least a portion of internal primary particles (i.e., the primary particles located at a non-outermost layer of the matrix).

In the lithium ion battery of the present disclosure, as the first coating layer is present in form of discrete islands and the second coating layer is present in form of a continuous layer, the first coating layer in form of discrete islands can function like "nano-nails" on the surfaces of the primary particles of the matrix. The first coating layer can not only be firmly bonded to the matrix to effectively lower the breakage probability of positive electrode active material particles during cycling, but also enhance a bonding force between the primary particles of the matrix such that the positive electrode active material (especially in form of secondary particles formed by agglomeration of primary particles) overall has an improved mechanical strength. Therefore, the positive electrode active material is not prone to breakage.

Figure 3:
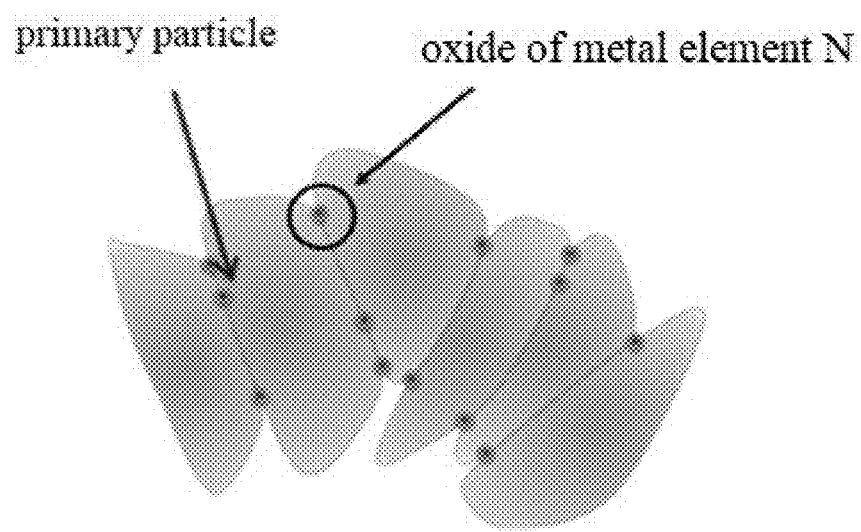
FIG. 3 is a structural schematic diagram of a positive electrode active material according to the present disclosure, in which the second coating layer is not shown.

FIG. 3 is a schematic structural diagram of a positive electrode active material of the present disclosure, in which the second coating layer is not shown. With reference to FIG. 3, the matrix of the positive electrode active material is present in form of secondary particles, which are formed by agglomeration of primary particles (in the form of agglomerates), and the oxide of metal element N located between the primary particles can function to adhere the primary particles together. FIG. 3 is merely a schematic view for illustratively showing the primary particles bonded by the oxide of metal element N, whereas the oxide of the metal element N can also be located at other positions on the surfaces of the primary particles as the "nano-nails".

In an embodiment of the lithium ion battery of the present disclosure, the matrix of the positive electrode active material has a particle diameter D50 of 5 μm to 25 μm, and preferably 8 μm to 18 μm.

In an embodiment of the lithium ion battery of the present disclosure, the positive electrode active material has a specific surface area of 0.3 m$^2$/g to 0.8 m$^2$/g.

In an embodiment of the lithium ion battery of the present disclosure, a content of the metal element N in the first coating layer is in a range of 0.05% to 1% based upon a mass of the matrix.

In an embodiment of the lithium ion battery of the present disclosure, a content of the element N' in the second coating layer is in a range of 0.05% to 0.8% based upon the mass of the matrix.

In an embodiment of the lithium ion battery of the present disclosure, the first coating layer further contains Li. That is, the first coating layer can be an oxide of one or more elements of Al, Zr, Mg, Ti, Co, Y, Ba, or Cd, or the first coating layer can be an oxide solid solution formed by Li$_2$O and an oxide of one or more elements of Al, Zr, Mg, Ti, Co, Y, Ba, or Cd.

In an embodiment of the lithium ion battery of the present disclosure, the second coating layer further contains Li. That is, the second coating layer can be an oxide of one or more elements of B, Sn, S, or P, or the second coating layer can be an oxide solid solution formed by Li$_2$O and an oxide of one or more elements of B, Sn, S, or P.

In an embodiment of the lithium ion battery of the present disclosure, in the matrix of the positive electrode active material, $0.70 \leq y \leq 0.95$, $0 \leq z \leq 0.2$, $0 \leq k \leq 0.2$, $0 \leq p \leq 0.05$, and $y+z+k+p=1$. Further preferably, the matrix of the positive active material is selected from the group consisting of $LiNi_{0.8}Co_{0.1}Mn_{0.1}O_2$, $LiNi_{0.70}Co_{0.15}Mn_{0.15}O_2$, $LiNi_{0.95}Co_{0.02}Mn_{0.03}O_2$, $LiNi_{0.8}Co_{0.1}Al_{0.1}O_2$, $LiNi_{0.70}Co_{0.15}Mn_{0.15}O_{1.8}F_{0.2}$, $LiNi_{0.8}Co_{0.1}Mn_{0.08}Zr_{0.02}O_2$, $LiNi_{0.75}Co_{0.15}Mn_{0.05}Nb_{0.05}O_2$, and combinations thereof.

In an embodiment of the lithium ion battery of the present disclosure, a content of Li$_2$CO$_3$ in the surface of the positive electrode active material ranges from 300 ppm to 3000 ppm, and a content of LiOH in the surface of the positive electrode active material ranges from 1500 ppm to 5000 ppm.

In an embodiment of the lithium ion battery of the present invention, in the residual lithium materials on the surface of the positive electrode active material, the content of LiOH is higher than the content of Li$_2$CO$_3$.

In an embodiment of the lithium ion battery of the present invention, the positive electrode film further includes a binder and a conductive agent, which are not specifically limited and can be selected according to requirements.

In an embodiment of the lithium ion battery of the present invention, the type of the positive electrode current collector is not specifically limited and can be selected according to requirements. Preferably, the positive electrode current collector is an aluminum foil.

In an embodiment of the lithium ion battery of the present invention, the positive electrode active material is prepared by a method including the following steps: S1. adding oxide nanoparticles of metal element N to deionized water, stirring and ultrasonically shaking the mixture to obtain a uniformly dispersed aqueous solution of metal element N oxide; S2. adding a matrix $Li_xNi_yCo_zM_kMe_pO_rA_m$ of the positive electrode active material to the aqueous solution of metal element N oxide, stirring the mixture until the residual lithium material on the surface of the matrix is dissolved in water and the nanoparticles of metal element N oxide are attached to the surface of the matrix, followed by filtering and drying the mixture to remove the solvent and obtain a powder; S3. mixing the powder obtained in the step S2 with an elementary substance or a compound containing element N', and then performing a heat treatment to obtain a positive electrode active material.

In the method for preparing the positive electrode active material, a first coating treatment is carried out simultaneously while the matrix is washed with water, in order to firmly bond the first coating layer to the matrix. In this way, the breakage probability of the positive electrode active material particles during cycling can be effectively lowered, and the second coating layer can also be uniformly coated after the heat treatment, thereby effectively reducing the surface roughness and the specific surface area of the positive electrode active material. Further, the effective contact area between the electrolyte and the surface of the positive electrode active material, as well as the side reaction therebetween can be reduced, and thus the gas production of the lithium ion battery is reduced.

Further, in the method for preparing the positive electrode active material, after the drying procedure in step S2, the nanoparticles of metal element N oxide are present in form of discrete islands on the surface of the matrix and function as "nano-nails" on the surfaces of the primary particles of the matrix. Further, after the heat treatment procedure in step S3, e.g., a sintering procedure, the bonding between the first coating layer formed by the nanoparticles of metal element N oxide and the matrix is strengthened, and the bonding force between the primary particles in the matrix is also enhanced by co-melting and bonding of the nanoparticles of metal element N oxide on the surfaces of the primary particles. Therefore, the positive electrode active material (especially in form of the secondary particles formed by agglomeration of primary particles) overall has an increased mechanical strength, and is not prone to breakage.

In the preparation method of the positive electrode active material, the first coating layer still maintains a morphology of discrete islands after both the first coating layer and the second coating layer are composited on the surface of the matrix of the positive electrode active material in the heat treatment process of step S3. In other words, through the drying process of step S2, the nanoparticles of metal element N oxide can be bonded to and coated on the surface of the matrix, and after the heat treatment process of step S3, the bonding between the nanoparticles of metal element N oxide and the matrix is strengthened while the composite process between the first coating layer and the second coating layer on the surface of the matrix is finished. However, the morphology of the nanoparticles of metal element N oxide (or the first coating layer) does not change substantially during the heat treatment process of step S3. For example, even a small amount of melting may occur, the first coating layer as a whole is still present in form of discrete islands with protrusions, rather than forming a continuous layer.

In the preparation method of the positive electrode active material, in step S1, the nanoparticles of metal element N oxide have a particle diameter smaller than or equal to 100 nm. Preferably, the particle diameter of the nanoparticles of metal element N is in a range of 5 nm to 10 nm.

In the preparation method of the positive electrode active material, in step S2, the residual lithium materials, such as LiOH and Li$_2$CO$_3$, on the surface of the matrix are soluble in water. The nanoparticles of metal element N oxide in the aqueous solution have a small particle diameter and thus can be adsorbed on primary particles of the matrix to finally form the first coating layer in form of discrete islands, which effectively reduces the breakage probability of the positive electrode active material particles during cycling. At the same time, the nanoparticles of metal element N oxide, which are absorbed at the contact position between the primary particles of the matrix, are co-melted through the heat treatment (sintering process) of step S3 to bond the primary particles together, so that the positive electrode active material overall has a further increased mechanical strength and is not prone to breakage. When the matrix of the positive electrode active material is present in form of secondary particles that are formed by agglomeration of primary particle, the nanoparticles of metal element N oxide may also be adsorbed on surfaces of a part of the primary particles inside the matrix (i.e., the primary particles located at a non-outermost layer of the matrix), eventually forming the first coating layer in form of discrete islands.

In the preparation method of the positive electrode active material, the drying in step S2 is carried out at a temperature of 80° C. to 150° C.

In the preparation method of the positive electrode active material, the elementary substance or compound containing the element N' is preferably a substance having a low melting point, and further preferably, having a melting point not higher than 500° C.

In the preparation method of the positive electrode active material, preferably, the compound containing the element N' may be $B_2O_3$, $H_3BO_3$, or $P_2O_5$. The coating can be performed by using Sn, S, and P in elementary form. The coating with B is preferably performed with a compound containing B, such as $B_2O_3$ or $H_3BO_3$, and the coating with P is also performed with a compound containing P such as $P_2O_5$. The elementary substance of B, Sn, S, or P and compounds thereof (such as $B_2O_3$, $H_3BO_3$, or $P_2O_5$) all have lower melting points and thus can be melted at a relatively low temperature. Therefore, these elementary substances and compounds can form a dense and continuous coating layer (i.e., the second coating layer) on surfaces of the primary particles that constitute the outermost layer of the matrix, which is in form of secondary particles, as well as on the surfaces of at least a portion of internal primary particles (i.e., the primary particles located at a non-outermost layer of the matrix). In another embodiment, the elementary substances and compounds can form a dense and continuous second coating layer only on surfaces of the primary particles that constitute the outermost layer of the matrix, which is present in form of secondary particles. In this way, the surface roughness and the specific surface area of the positive electrode active material can be effectively reduced, which in turn reduces the effective contact area between the electrolyte and the surface of the positive electrode active material, thereby reducing the side reactions therebetween and reducing the gas production of the lithium ion battery.

In the preparation method of the positive electrode active material, the heat treatment in step S3 is carried out at a temperature ranging from 150° C. to 500° C. The heat treatment at a relatively low temperature leads to a firm bonding between the matrix and the first coating layer, which is present in form of discrete islands on the surface of the matrix, and allows a further uniform coating of a second coating layer, as a dense and continuous layer, on the matrix and the first coating layer. In addition, the heat treatment at the relatively low temperature can avoid the molten of lithium from the matrix.

In the lithium ion battery of the present disclosure, the negative electrode plate includes a negative electrode current collector, and a negative electrode film provided on the surface of the negative electrode current collector and containing a negative electrode active material. The negative electrode active material can be selected from the group consisting of metallic lithium, natural graphite, artificial graphite, meso carbon microbeads (abbreviated as MCMB), hard carbon, soft carbon, silicon, silicon-carbon composite, SiO, Li—Sn—O alloy, Sn, SnO, $SnO_2$, $Li_4Ti_5O_{12}$ with spinel-structure, Li—Al alloy, and combinations thereof.

In the lithium ion battery of the present disclosure, the negative electrode film further contains a binder and a conductive agent, which are not specifically limited and can be selected according to requirements.

In the lithium ion battery of the present disclosure, the type of the negative electrode current collector is not specifically limited and can be selected according to requirements. Preferably, the negative electrode current collector is a copper foil.

In the lithium ion battery of the present disclosure, the electrolyte, which includes a lithium salt and an organic solvent, further includes an additive A and an additive B.

In the lithium ion battery of the present disclosure, the additive A is selected from a group consisting of cyclic sulfate compounds represented by Formula 1 and Formula 2, and combinations thereof. In Formula 1 and Formula 2, m is an integer selected from 1 to 3, n is an integer selected from 0 to 3, and $R_1$, $R_2$, $R_3$, $R_4$, $R_5$, $R_6$, $R_7$, and $R_8$ are each independently selected from a group consisting of hydrogen, halogen, cyano, carboxyl, sulfonyl, $C_1$-$C_{20}$ alkyl, $C_1$-$C_{20}$ halogenated alkyl, $C_2$-$C_{20}$ unsaturated hydrocarbyl, and $C_2$-$C_{20}$ halogenated unsaturated hydrocarbyl.

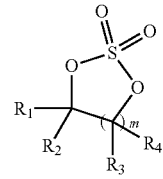

Formula 1

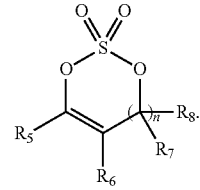

Formula 2

In Formula 1 and Formula 2, when $R_1$ to $R_8$ are each independently $C_1$-$C_{20}$ alkyl, the alkyl is not specifically limited and can be selected according to actual requirements, either chain alkyl or cyclic alkyl. The chain alkyl further includes linear alkyl and branched alkyl. The cyclic alkyl can have a substituent or not. Among them, the $C_1$-$C_{20}$ alkyl is preferably a linear alkyl.

$R_1$ to $R_8$ are each independently $C_1$-$C_{10}$ alkyl, preferably $C_1$-$C_5$ alkyl, more preferably $C_1$-$C_3$ alkyl.

The $C_1$-$C_{20}$ alkyl is selected from the group consisting of methyl, ethyl, n-propyl, iso-propyl, cyclopropyl, n-butyl, iso-butyl, sec-butyl, tert-butyl, n-pentyl, and iso-pentyl, neo-pentyl, cyclopentyl, n-hexyl, iso-hexyl, cyclohexyl, heptyl, cycloheptyl, octyl, cyclooctyl, nonyl, decyl, undecyl, dodecyl, tridecyl, tetradecyl, pentadecyl, hexadecyl, heptadecyl, octadecyl, nonadecyl, and eicosyl.

The $C_1$-$C_{20}$ halogenated alkyl is the $C_1$-$C_{20}$ alkyl partially or fully substituted with one or more halogens, in which the number and position of substitution of halogen are not specifically limited and can be selected according to actual requirements. For example, the substitution number of halogens can be 1, 2, 3 or 4. When the substitution number of the halogen is 2 or more, the 2 or more halogen atoms can be identical, completely different, or partially identical. Preferably, halogen is one or two of F and Cl.

The $C_1$-$C_{20}$ halogenated alkyl is any one of the following groups, in which X can be F, Cl, Br, or I,

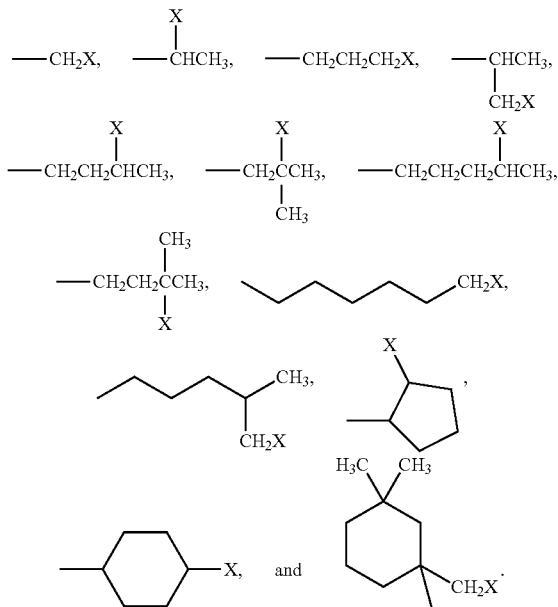

In Formula 1 and Formula 2, if $R_1$ to $R_8$ are each independently $C_2$-$C_{20}$ unsaturated hydrocarbyl, the unsaturated hydrocarbyl is not specifically limited and can be selected according to actual requirements. Preferably, the unsaturated hydrocarbyl is alkenyl or alkynyl. The number and position of unsaturated bonds (double bond, triple bond) in the unsaturated hydrocarbyl are not specifically limited, and can be selected according to actual conditions. For example, the number of unsaturated bonds can be 1, 2, 3 or 4.

$R_1$ to $R_8$ are each independently $C_2$-$C_{10}$ unsaturated hydrocarbyl, preferably, $C_2$-$C_5$ unsaturated hydrocarbyl, and more preferably $C_2$-$C_3$ unsaturated hydrocarbyl.

The $C_2$-$C_{10}$ unsaturated hydrocarbyl is selected from a group consisting of —CH=CH$_2$, —CH$_2$—CH=CH$_2$, —CH$_2$CH$_2$—CH=CH$_2$, —CH$_2$CH$_2$CH$_2$—CH=CH$_2$—C≡CH, —CH$_2$—C≡CH, —CH$_2$CH$_2$—C≡CH, —CH$_2$CH$_2$CH$_2$—C≡CH, and —CH=CH—CH=CH$_2$.

The $C_2$-$C_{20}$ halogenated unsaturated hydrocarbyl is the $C_2$-$C_{20}$ unsaturated hydrocarbyl partially or fully substituted with one or more halogens, in which the substitution number and substitution position of the halogens are not specifically limited and can be selected according to actual requirements. For example, the substitution number of the halogens can be 1, 2, 3 or 4. When the substitution number of halogens is 2 or more, the 2 or more halogen atoms can be identical, completely different, or partially identical. Preferably, halogen is one or two of F and Cl.

The $C_2$-$C_{20}$ halogenated unsaturated hydrocarbyl is any one of the following groups, in which X can be F, Cl, Br, or I,

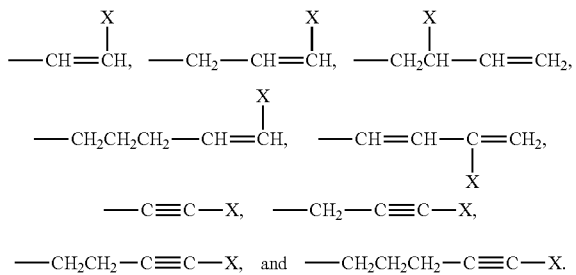

In the lithium ion battery of the present disclosure, m is preferably 1 or 2, and n is preferably 0 or 1.

In the lithium ion battery of the present disclosure, $R_1$ to $R_8$ are each independently selected from the group consisting of H, halogen, $C_1$-$C_{10}$ alkyl, $C_1$-$C_{10}$ halogenated alkyl, $C_2$-$C_{10}$ unsaturated hydrocarbyl, and $C_2$-$C_{10}$ halogenated unsaturated hydrocarbyl. Further preferably, $R_1$ to $R_8$ are each independently selected from the group consisting of H, halogen, $C_1$-$C_5$ alkyl, $C_1$-$C_5$ halogenated alkyl, $C_2$-$C_5$ unsaturated hydrocarbyl, and $C_2$-$C_5$ halogenated unsaturated hydrocarbyl. More preferably, $R_1$ to $R_8$ are each independently selected from the group consisting of H, halogen, $C_1$-$C_5$ alkyl, and $C_1$-$C_5$ halogenated alkyl.

Specifically, the additive A is one or more of the following compounds:

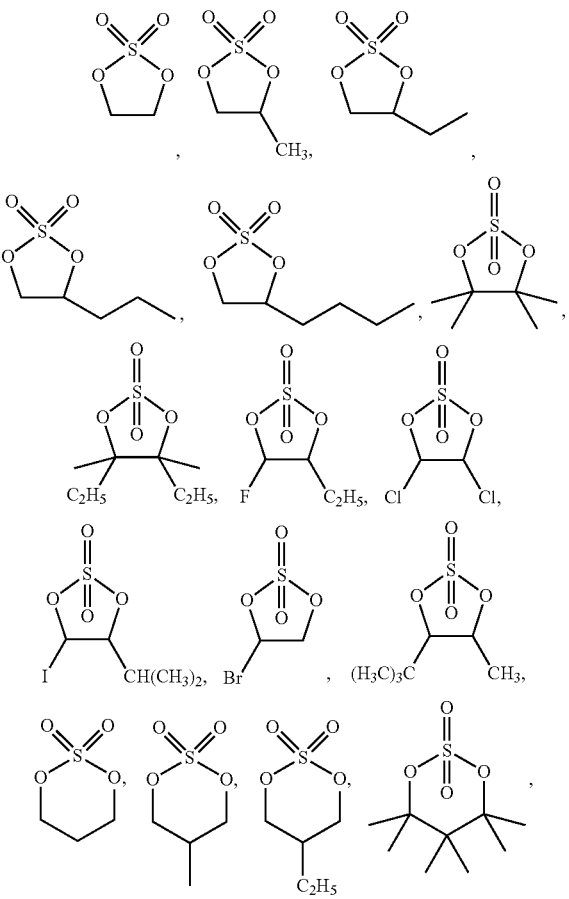

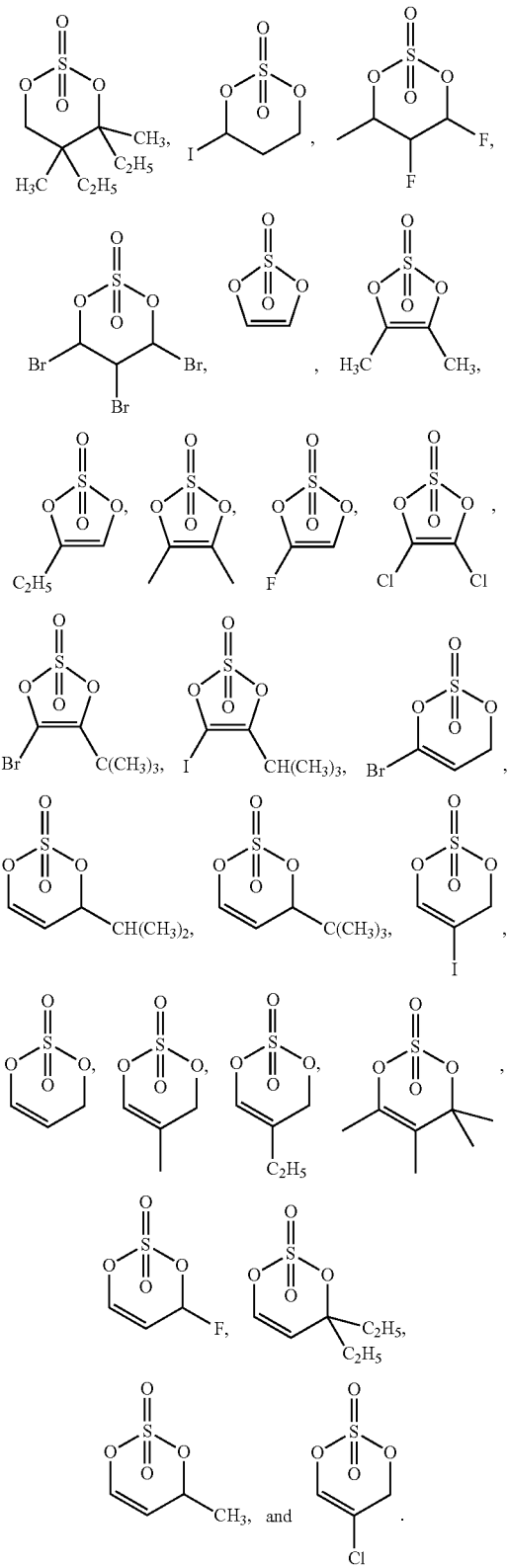

In the lithium ion battery of the present disclosure, the additive B is one or two of lithium difluorobisoxalate phosphate and lithium tetrafluorooxalate phosphate.

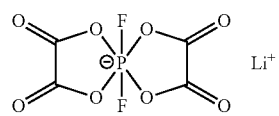 [SMILES: O=C1O[P-]2(F)(F)(OC1=O)OC(=O)C(=O)O2 ; [Li+]]

lithium difluorobisoxalate phosphate;

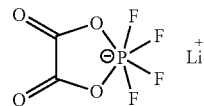 [SMILES: O=C1O[P-](F)(F)(F)(F)OC1=O ; [Li+]]

lithium tetrafluorooxalate phosphate.

In the lithium ion battery of the present disclosure, the —O—SO$_2$—O— group in the cyclic sulfate compound can be oxidized, ring-opened and polymerized on the surface of the positive electrode active material to form a polymer film, which contains the lithium sulfate salt (ROSO$_3$Li) represented by Formula 3 as a main component. The polymer film covers the surface of the positive electrode active material, so as to block the contact between the positive electrode active material and the electrolyte, and inhibit the oxidative decomposition of the electrolyte. The lithium difluorobisoxalate phosphate and/or lithium tetrafluorooxalate phosphate, due to the functional group of oxalate, can be easily oxidized on the surface of the positive electrode active material, so as to form an inorganic lithium salt containing characteristic elements such as P and F. The P element in the inorganic salt has a vacancy orbit that can be occupied by the lone pair electrons of oxygen in the positive electrode active material, and thus the oxidation activity of the positive electrode active material is lowered.

Formula 3

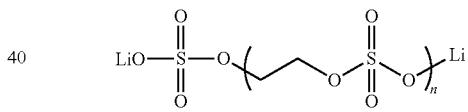

When the electrolyte contains both the cyclic sulfate compound and lithium difluorobisoxalate phosphate and/or lithium tetrafluorooxalate phosphate, these additives can cooperatively form a dense and solid composite film on the surface of the positive electrode. The composite film is constituted by the polymer film mainly containing the lithium sulfate salt (ROSO$_3$Li) represented by Formula 3 and the inorganic lithium salt containing the characteristic elements such as P and F. The composite film reduces the oxidation activity of the positive electrode active material, blocks the contact between the positive electrode active material and the electrolyte, and inhibits the oxidative decomposition of the electrolyte, thereby imparting the lithium ion battery with more excellent cycle life and storage life. When only the cyclic sulfate compound is used in the electrolyte, a polymer film is continuously formed on the surface of the positive electrode active material, which results in a continuous increase in the interface impedance of the positive electrode during cycling and storage of the lithium ion battery, such that the mobility of lithium ion and the power performance of the lithium ion battery are reduced, and the DCR of the lithium ion battery is significantly increased. In contrast, when the electrolyte additionally contains lithium difluorobisoxalate phosphate and/or lithium tetrafluorooxalate phosphate, the inorganic lithium salt containing the characteristic elements such as P and F, which is formed through oxidation, can modify the protective film on the surface of the positive electrode. In this way, the channels for diffusing lithium ions are maintained to be unimpeded during cycling and storage process. Moreover, the bonding of P in the inorganic lithium salt and O in the positive electrode active material can reduce the oxidation activity of the positive electrode active material and prevent the cyclic sulfate compound from continuously forming the polymer film at the positive electrode interface. Thus, the increase in DCR of the lithium ion battery is significantly suppressed during cycling and storage, and the power performance of the lithium ion battery is improved. The positive electrode active material of the present disclosure contains double coating layers at the surface of the matrix thereof, and thus the positive electrode active material has a higher stability of surface structure. In this regard, the oxidation activity of the positive electrode active material to the cyclic sulfate compound is further reduced, the increase in the interface impedance of the positive electrode can also be suppressed to a certain extent, thereby improving the power performance of the lithium ion battery.

In the lithium ion battery of the present disclosure, the content of the additive A is in a range of 0.01% to 3% based upon the total mass of the electrolyte. Preferably, the content of the additive A is in a range of 0.15% to 2.5% based upon the total mass of the electrolyte. Further preferably, the content of the additive A is in a range of 0.3% to 2% based upon the total mass of the electrolyte.

In the lithium ion battery of the present disclosure, the content of the additive B is in a range of 0.01% to 3% based upon the total mass of the electrolyte. Preferably, the content of the additive B is in a range of 0.1% to 2% based upon the total mass of the electrolyte. Further preferably, the content of the additive B is in a range of 0.2% to 1% based upon the total mass of the electrolyte.

In the lithium ion battery of the present disclosure, the type of the organic solvent is not specifically limited and may be selected according to requirements. Preferably, the organic solvent can be at least two of ethylene carbonate (EC), propylene carbonate, butylene carbonate, fluoroethylene carbonate, ethyl methyl carbonate (EMC), dimethyl carbonate, diethyl carbonate (DEC), dipropyl carbonate, methyl propyl carbonate, ethyl propyl carbonate, 1,4-butyrolactone, methyl propionate, methyl butyrate, ethyl acetate, ethyl propionate, ethyl butyrate, sulfolane, dimethyl sulfone, methyl ethyl sulfone, or diethyl sulfone.

In the lithium ion battery of the present disclosure, the type of the lithium salt is not specifically limited and can be selected according to requirements. The lithium salt can be selected from the group consisting of $LiPF_6$, $LiBF_4$, $LiClO_4$, $LiAsF_6$, LiFSI, LiTFSI, LiTFS, $LiPO_2F_2$, LiDFOB, LiBOB, and combinations thereof.

In the lithium ion battery of the present disclosure, the concentration of the lithium salt is not specifically limited and may be selected according to requirements. The concentration of the lithium salt can range from 0.5 mol/L to 1.5 mol/L, and preferably from 0.8 mol/L to 1.2 mol/L.

In the lithium ion battery of the present disclosure, the electrolyte can further contain one or more of vinylene carbonate (VC), vinyl ethylene carbonate (VEC), fluoroethylene carbonate (FEC), succinonitrile (SN), adipicdinitrile (ADN), 1,3-propenesultone (PST), tris(trimethylsilyl)phosphate (TMSP), or tris(trimethylsilyl)borate (TMSB).

In the lithium ion battery of the present disclosure, the electrolyte can be prepared by a conventional method, such as by evenly mixing the materials in the electrolyte. For example, the lithium salt, the additive A, and the additive B are added to an organic solvent and mixed to obtain the electrolyte. The order of addition of the materials is not specifically limited. For example, the lithium salt can be firstly added to the organic solvent, and then the additive A and the additive B can be added simultaneously and uniformly mixed to obtain the electrolyte.

In the lithium ion battery of the present disclosure, the specific type of the separator is not specifically limited and may be selected according to requirements. For example, the separator can be made of polyethylene, polypropylene, or polyvinylidene fluoride, or can be a multilayered composite film consisting of polyethylene, polypropylene, and polyvinylidene fluoride.

The present disclosure is further described in conjunction with the embodiments. It should be understood that these embodiments are not intended to limit the scope of the present disclosure. In the following embodiments, the reagents, materials, and instruments used are commercially available, unless otherwise specified.

In order to simplify the description, the additives used in the following embodiments are abbreviated as follows:

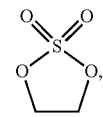
(Compound 1)

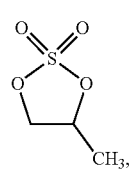
(Compound 2)

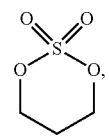
(Compound 3)

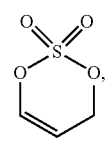
(Compound 4)

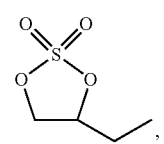
(Compound 5)

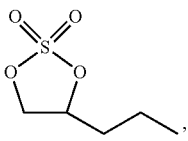
(Compound 6)

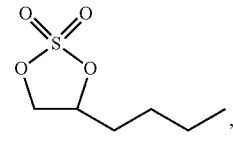
(Compound 7)

-continued

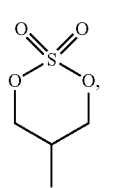

(Compound 8)

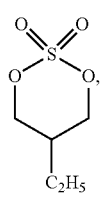

(Compound 9)

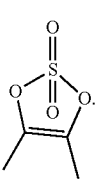

(Compound 10)

The lithium ion batteries of Embodiments 1-18 were all prepared by the following method.

(1) Preparation of Positive Electrode Active Material

The nanoparticles of metal element N oxide (having a particle diameter between 5 nm and 10 nm) and a surfactant were added to deionized water, stirred and ultrasonically shaken to obtain a uniformly dispersed aqueous solution of metal element N oxide. The matrix of the positive active material (having a particle diameter between 5 μm and 25 μm) was then added to the aqueous solution of metal element N oxide, and stirred to dissolve the residual lithium material on the surface of the matrix in water and attach the nanoparticles of metal element N oxide onto the surface of the matrix, followed by filtering and drying to remove deionized water and to obtain a powder. The obtained powder was mixed with an elementary substance or a compound containing the element N', and then subjected to a low-temperature heat treatment to obtain a positive electrode active material. The preparation parameters of the positive electrode active material are shown in Table 1.

(2) Preparation of Positive Electrode Plate

The positive electrode active material prepared in step (1), a conductive agent (Super P) and a binder (polyvinylidene fluoride (PVDF)) were mixed in a mass ratio of 97:1.4:1.6, added to a solvent of N-methylpyrrolidone (NMP), and stirred evenly in a vacuum mixer to obtain a positive electrode slurry, which had a solid content of 77 wt %. The positive electrode slurry was uniformly coated on an aluminum foil (as the positive electrode current collector), dried at 85° C., then subjected to cold pressing, trimming, cutting, and slitting, and finally dried in vacuum at 85° C. for 4 h to obtain a positive electrode plate. The specific positive electrode active materials are shown in Table 2.

(3) Preparation of Negative Electrode Plate

A negative electrode active material, a conductive agent (Super P), a thickener (sodium carboxymethylcellulose (CMC)), and a binder (styrene-butadiene rubber emulsion (SBR)) were mixed in a mass ratio of 96.4:1.5:0.5:1.6, added to a solvent of deionized water, stirred uniformly in a vacuum mixer to obtain a negative electrode slurry, which has a solid content of 54 wt %. The negative electrode slurry was uniformly coated on a copper foil (as the negative electrode current collector), dried at 85° C., then subjected to cold pressing, trimming, cutting, and slitting, and finally dried in vacuum at 120° C. for 12 h to obtain a negative electrode plate. The specific negative electrode active materials are shown in Table 2.

(4) Preparation of Electrolyte

The organic solvent used in the electrolyte was a mixture of ethylene carbonate (EC), ethyl methyl carbonate (EMC) and diethyl carbonate (DEC), in a volume ratio of EC, EMC and DEC of 20:20:60. In an argon atmosphere glove box having a water content smaller than 10 ppm, a sufficiently dried lithium salt was dissolved in the above organic solvent, and then the additives were added and uniformly mixed to obtain the electrolyte. The concentration of the lithium salt in the electrolyte was 1 mol/L. The specific lithium salts used in the electrolyte and the specific type and content of the additives used in the electrolyte are shown in Table 3. In Table 3, the content of each additive was a mass percentage calculated based on the total mass of the electrolyte.

(5) Preparation of Separator

A polyethylene film (PE) having a thickness of 14 μm was used as the separator.

(6) Preparation of Lithium Ion Battery

The positive electrode plate, the separator and the negative electrode plate were stacked in an order that the separator isolate the positive and negative electrode plates, and then wound to a prismatic bare cell, following by welding with electrode tabs. The bare cell was then packed with an Al-plastic film, baked at 80° C. to remove water, filled with the electrolyte, and sealed. A finished soft package lithium ion battery having a thickness of 4.0 mm, a width of 60 mm, and a length of 140 mm was obtained after being subjected to still-standing, hot/cold pressing, formation (charged to 3.3 V with a constant current of 0.02 C, then charged to 3.6V with a constant current of 0.1 C), shaping, capacity testing, and the like.

The lithium ion batteries of Comparative Examples 1-7 were prepared in the same method as Embodiments 1-18 except the following differences.

Comparative Examples 1-4: a lithium nickel cobalt manganese ternary material $LiNi_{0.8}Co_{0.1}Mn_{0.1}O_2$(NCM811), which is conventional commercially available, was directly used as the positive electrode active material to prepare the positive electrode plate.

Comparative Example 5: a conventional commercially available NCM811 was used as the positive electrode active material to prepare the positive electrode plate after being washed with water and subjected to a high temperature heat treatment. The specific preparation process of the positive electrode active material includes: adding NCM811 into deionized water, stirring to dissolve the residual lithium material on its surface in the deionized water, then filtering, and drying at 80° C. to obtain a powder; mixing the obtained powder with $Al(NO_3)_3$ and performing the heat treatment at 600° C. to obtain the positive electrode active material.

Comparative Example 6: a conventional commercially available NCM811 was used as the positive electrode active material to prepare the positive electrode plate after being washed with water and subjected to a high temperature heat treatment. The specific preparation process of the positive electrode active material includes: adding NCM811 into deionized water, stirring to dissolve the residual lithium material on its surface in the deionized water, then filtering, and drying at 80° C. to obtain a powder; mixing the obtained powder with $H_3BO_3$ and performing the heat treatment at 600° C. to obtain the positive electrode active material.

Comparative Example 7: alumina nanoparticles having a particle diameter of 10 nm were dispersed in deionized water to obtain a uniformly dispersed aqueous solution of alumina nanoparticles; a conventional commercially available NCM811 matrix was added to the aqueous solution of alumina nanoparticles, stirred to react the residual lithium material on the surface of the matrix with water and to attach the alumina nanoparticles to the surface of the matrix, then filtered, dried at 80° C., and then subjected to the heat treatment at 500° C. for 12 h to obtain the positive electrode active material.

In Comparative Examples 1-7, the preparation parameters of the positive electrode active materials are shown in Table 1, the specific types of the positive electrode active material and the negative electrode active material are shown in Table 2, the specific lithium salt and the specific types and contents of the additives used in the electrolytes are shown in Table 3.

TABLE 1

Preparation parameters of positive electrode active materials in Embodiments 1-18 and Comparative Examples 1-7

|  | Matrix | Metal element N oxide | | | N' element or compound of N' | | |
|---|---|---|---|---|---|---|---|
|  |  | Material | Concentration of element N | Temperature of drying/° C. | Material | Concentration of element N' | Temperature of heat treatment/° C. |
| Embodiment 1 | $LiNi_{0.8}Co_{0.1}Mn_{0.1}O_2$ | $Co_3O_4$ | 0.2% | 120 | $H_3BO_3$ | 0.2% | 400 |
| Embodiment 2 | $LiNi_{0.8}Co_{0.1}Mn_{0.1}O_2$ | $ZrO_2$ | 0.2% | 120 | $H_3BO_3$ | 0.2% | 400 |
| Embodiment 3 | $LiNi_{0.8}Co_{0.1}Mn_{0.1}O_2$ | $Al_2O_3$ | 0.05% | 120 | $H_3BO_3$ | 0.2% | 400 |
| Embodiment 4 | $LiNi_{0.8}Co_{0.1}Mn_{0.1}O_2$ | $Al_2O_3$ | 0.1% | 120 | $H_3BO_3$ | 0.2% | 400 |
| Embodiment 5 | $LiNi_{0.8}Co_{0.1}Mn_{0.1}O_2$ | $Al_2O_3$ | 0.2% | 120 | $H_3BO_3$ | 0.2% | 400 |
| Embodiment 6 | $LiNi_{0.8}Co_{0.1}Mn_{0.1}O_2$ | $Al_2O_3$ | 0.3% | 120 | $H_3BO_3$ | 0.2% | 400 |
| Embodiment 7 | $LiNi_{0.8}Co_{0.1}Mn_{0.1}O_2$ | $Al_2O_3$ | 0.5% | 120 | $H_3BO_3$ | 0.2% | 400 |
| Embodiment 8 | $LiNi_{0.8}Co_{0.1}Mn_{0.1}O_2$ | $Al_2O_3$ | 1% | 120 | $H_3BO_3$ | 0.2% | 400 |
| Embodiment 9 | $LiNi_{0.8}Co_{0.1}Mn_{0.1}O_2$ | $Al_2O_3$ | 0.2% | 120 | $H_3BO_3$ | 0.05% | 400 |
| Embodiment 10 | $LiNi_{0.8}Co_{0.1}Mn_{0.1}O_2$ | $Al_2O_3$ | 0.2% | 120 | $H_3BO_3$ | 0.1% | 400 |
| Embodiment 11 | $LiNi_{0.8}Co_{0.1}Mn_{0.1}O_2$ | $Al_2O_3$ | 0.2% | 120 | $H_3BO_3$ | 0.3% | 400 |
| Embodiment 12 | $LiNi_{0.8}Co_{0.1}Mn_{0.1}O_2$ | $Al_2O_3$ | 0.2% | 120 | $H_3BO_3$ | 0.5% | 400 |
| Embodiment 13 | $LiNi_{0.8}Co_{0.1}Mn_{0.1}O_2$ | $Al_2O_3$ | 0.2% | 120 | $H_3BO_3$ | 0.8% | 400 |
| Embodiment 14 | $LiNi_{0.8}Co_{0.1}Mn_{0.1}O_2$ | $Al_2O_3$ | 0.2% | 120 | Element S | 0.2% | 200 |
| Embodiment 15 | $LiNi_{0.8}Co_{0.1}Mn_{0.1}O_2$ | $Al_2O_3$ | 0.2% | 120 | Element Sn | 0.2% | 300 |
| Embodiment 16 | $LiNi_{0.8}Co_{0.1}Mn_{0.1}O_2$ | $Al_2O_3$ | 0.2% | 120 | $P_2O_5$ | 0.2% | 300 |
| Embodiment 17 | $LiNi_{0.75}Co_{0.15}Mn_{0.1}O_2$ | $Al_2O_3$ | 0.2% | 120 | $H_3BO_3$ | 0.2% | 400 |
| Embodiment 18 | $LiNi_{0.95}Co_{0.02}Mn_{0.03}O_2$ | $Al_2O_3$ | 0.2% | 120 | $H_3BO_3$ | 0.2% | 400 |
| Comparative Example 1 | $LiNi_{0.8}Co_{0.1}Mn_{0.1}O_2$ | / | / | / | / | / | / |
| Comparative Example 2 | $LiNi_{0.8}Co_{0.1}Mn_{0.1}O_2$ | / | / | / | / | / | / |
| Comparative Example 3 | $LiNi_{0.8}Co_{0.1}Mn_{0.1}O_2$ | / | / | / | / | / | / |
| Comparative Example 4 | $LiNi_{0.8}Co_{0.1}Mn_{0.1}O_2$ | / | / | / | / | / | / |
| Comparative Example 5 | $LiNi_{0.8}Co_{0.1}Mn_{0.1}O_2$ | $Al_2O_3$ | 0.2% | 80 | / | / | 600 |
| Comparative Example 6 | $LiNi_{0.8}Co_{0.1}Mn_{0.1}O_2$ | $H_3BO_3$ | 0.2% | 80 | / | / | 600 |
| Comparative Example 7 | $LiNi_{0.8}Co_{0.1}Mn_{0.1}O_2$ | $Al_2O_3$ | 0.2% | 80 | / | / | 600 |

NOTES:
The concentration of the element N and the concentration of the element N' were calculated based on the mass of the matrix.

TABLE 2

The positive electrode active materials and negative electrode active materials of Embodiments 1-18 and Comparative Examples 1-7

|  | Positive electrode active material | | | | Negative electrode active material |
|---|---|---|---|---|---|
|  | First coating layer | | Second coating layer | |  |
|  | Morphology | Material | Morphology | Material |  |
| Embodiment 1 | Island-like | Co-containing oxide | Continuous | B-containing oxide | Graphite |
| Embodiment 2 | Island-like | Zr-containing oxide | Continuous | B-containing oxide | Graphite |
| Embodiment 3 | Island-like | Al-containing oxide | Continuous | B-containing oxide | Graphite |
| Embodiment 4 | Island-like | Al-containing oxide | Continuous | B-containing oxide | Graphite |
| Embodiment 5 | Island-like | Al-containing oxide | Continuous | B-containing oxide | Graphite |
| Embodiment 6 | Island-like | Al-containing oxide | Continuous | B-containing oxide | Graphite |
| Embodiment 7 | Island-like | Al-containing oxide | Continuous | B-containing oxide | Graphite |
| Embodiment 8 | Island-like | Al-containing oxide | Continuous | B-containing oxide | Graphite |
| Embodiment 9 | Island-like | Al-containing oxide | Continuous | B-containing oxide | Graphite |
| Embodiment 10 | Island-like | Al-containing oxide | Continuous | B-containing oxide | Graphite |
| Embodiment 11 | Island-like | Al-containing oxide | Continuous | B-containing oxide | Graphite |

TABLE 2-continued

The positive electrode active materials and negative electrode active materials of Embodiments 1-18 and Comparative Examples 1-7

| | Positive electrode active material | | | | Negative electrode active material |
|---|---|---|---|---|---|
| | First coating layer | | Second coating layer | | |
| | Morphology | Material | Morphology | Material | |
| Embodiment 12 | Island-like | Al-containing oxide | Continuous | B-containing oxide | Graphite |
| Embodiment 13 | Island-like | Al-containing oxide | Continuous | B-containing oxide | Graphite |
| Embodiment 14 | Island-like | Al-containing oxide | Continuous | S-containing oxide | Graphite + SiO |
| Embodiment 15 | Island-like | Al-containing oxide | Continuous | Sn-containing oxide | Graphite + SiO |
| Embodiment 16 | Island-like | Al-containing oxide | Continuous | P-containing oxide | Graphite + SiO |
| Embodiment 17 | Island-like | Al-containing oxide | Continuous | B-containing oxide | Graphite + SiO |
| Embodiment 18 | Island-like | Al-containing oxide | Continuous | B-containing oxide | Graphite + SiO |
| Comparative example 1 | / | / | / | / | Graphite |
| Comparative example 2 | / | / | / | / | Graphite |
| Comparative example 3 | / | / | / | / | Graphite |
| Comparative example 4 | / | / | / | / | Graphite |
| Comparative example 5 | Continuous | Al-containing oxide | / | / | Graphite |
| Comparative example 6 | Continuous | B-containing oxide | / | / | Graphite |
| Comparative example 7 | Island-like | Al-containing oxide | / | / | Graphite |

TABLE 3

Parameters of electrolytes of Embodiments 1-18 and Comparative Examples 1-7

| | Lithium salt Concentration and type | Cyclic sulfate compound | | Lithium difluorobisoxalate phosphate | Lithium tetrafluorooxalate phosphate | Other additive |
|---|---|---|---|---|---|---|
| | | Type | Content | Content | Content | |
| Embodiment 1 | 1M LiPF$_6$ | compound 1 | 1.0% | 0.01% | / | / |
| Embodiment 2 | 1M LiPF$_6$ | compound 1 | 1.0% | 0.3% | / | / |
| Embodiment 3 | 1M LiPF$_6$ | compound 1 | 1.0% | 0.5% | / | / |
| Embodiment 4 | 1M LiPF$_6$ | compound 1 | 1.0% | 1.0% | / | / |
| Embodiment 5 | 1M LiPF$_6$ | compound 1 | 1.0% | 3.0% | / | / |
| Embodiment 6 | 1M LiPF$_6$ | compound 1 | 0.01% | 0.5% | / | / |
| Embodiment 7 | 1M LiPF$_6$ | compound 1 | 0.5% | 0.5% | / | / |
| Embodiment 8 | 1M LiPF$_6$ | compound 1 | 3.0% | 0.5% | / | / |
| Embodiment 9 | 1M LiPF$_6$ | compound 1 | 1.5% | 0.2% | 0.3% | / |
| Embodiment 10 | 1M LiPF$_6$ | compound 2 | 2.0% | 0.5% | 0.5% | / |
| Embodiment 11 | 1M LiPF$_6$ | compound 3 | 0.5% | 0.3% | 0.3% | / |
| Embodiment 12 | 1M LiPF$_6$ | compound 4 | 1.5% | 0.5% | / | 0.5% VC |
| Embodiment 13 | 1M LiPF$_6$ | compound 5 | 0.1% | 0.5% | / | 1% FEC |
| Embodiment 14 | 0.5M LiPF$_6$ | compound 6 | 0.5% | 0.5% | / | 1% SN |
| Embodiment 15 | 0.8M LiPF$_6$ | compound 7 | 2.0% | 0.5% | / | 0.5% PST |
| Embodiment 16 | 1.5M LiPF$_6$ | compound 8 | 1.0% | 0.5% | / | 0.8% VEC |
| Embodiment 17 | 1M LiClO$_4$ | compound 9 | 1.0% | 0.5% | / | 0.5% VC + 0.3% SN |
| Embodiment 18 | 1M LiAsF$_6$ | compound 10 | 1.0% | 0.5% | / | 0.3% VC + 1% VEC |
| Comparative Example 1 | 1M LiPF$_6$ | / | / | / | / | / |
| Comparative Example 2 | 1M LiPF$_6$ | compound 1 | 1.0% | / | / | / |
| Comparative Example 3 | 1M LiPF$_6$ | / | / | 0.5% | / | / |
| Comparative Example 4 | 1M LiPF$_6$ | compound 1 | 1.0% | 0.5% | / | / |
| Comparative Example 5 | 1M LiPF$_6$ | compound 1 | 1.0% | 0.5% | / | / |
| Comparative Example 6 | 1M LiPF$_6$ | compound 1 | 1.0% | 0.5% | / | / |
| Comparative Example 7 | 1M LiPF$_6$ | compound 1 | 1.0% | 0.5% | / | / |

The measurement process of the lithium ion battery will be described as below.

(1) Measurement of Content of Residual Lithium Material on the Surface of Positive Electrode Active Material 30 g of the positive electrode active material powder was added to 100 mL of water and stirred for 30 minutes, and free lithium in the sample was titrated with a hydrochloric acid standard solution. Using the composite pH electrode as the indicator electrode, the end point of the titration was determined by the sudden jump caused by the potential change.

(2) Measurement of Specific Surface Area of Positive Electrode Active Material 5 g of the positive active material powder was placed in a sample tube, degassed by heating, then weighed and placed on a test instrument. After measuring the adsorption amounts of gas on the solid surface under different relative pressures at a constant low temperature (−296.7° C.), the absorption amount of a single molecule layer of the sample was obtained based on the multilayer adsorption theory of Brunauer-Emmett-Teller (BET) and its formula, and then the specific surface area of the positive electrode active material was calculated.

(3) Gas Production Test of Lithium Ion Battery after Storage at High Temperature At 25° C., the lithium ion battery was charged with a constant current of 0.5 C to a voltage of 4.2 V, and then charged with a constant voltage of 4.2 V until the current was 0.05 C. The initial volume of the lithium ion battery at that time was measured by the drainage method and recorded as $V_0$, and then the lithium ion battery was stored in an incubator at 80° C. for 360 h. After the storage, the lithium ion battery was take out, and the volume of the lithium ion battery was tested again using the drainage method and record as $V_1$. 15 lithium ion batteries as a group were tested to calculate the average value.

The volume expansion ratio (%) of the lithium ion battery after storage at 80° C. for 360 hours=$(V_1-V_0)/V_0\times100\%$.

(4) Cycling Performance Test of Lithium Ion Battery at High Temperature

At 45° C., the lithium ion battery was charged with a constant current of 1 C to 4.2 V, then charged with a constant voltage of 4.2 V until the current was 0.05 C, and then discharged with a constant current of 1 C to 2.8 V, as one charge/discharge cycle. The discharge capacity at that time was taken as the discharge capacity of the first cycle. The lithium ion battery was subjected to 1000 cycles of charge/discharge cycles as described above. 15 lithium ion batteries as one group were tested to calculate the average value.

The capacity retention ratio (%) of the lithium ion battery after 1000 cycles at 45° C.=the discharge capacity of the $1000^{th}$ cycle/the discharge capacity of the $1^{st}$ cycle$\times100\%$.

(5) Storage Performance Test of Lithium Ion Battery at High Temperature

At 25° C., the lithium ion battery was charged with a constant current of 0.5 C to 4.2 V, then charged with a constant voltage of 4.2 V until the current was 0.05 C, and then discharged with a constant current of 1 C to 2.8 V to record an initial discharge capacity $C_0$. Then, the lithium ion battery was charged with a constant current of 0.5 C to 4.2V, and then charged with a constant voltage of 4.2V to a current of 0.05 C. After the fully charged lithium ion battery was placed in an incubator at 60° C. for 180 days, the lithium ion battery was taken out from the incubator, the reversible capacity of the lithium ion battery was measured and recorded as $C_{180}$. 15 lithium ion batteries as one group were tested to calculate the average value.

The capacity retention ratio (%) of the lithium ion battery after storage at 60° C. for 180 days=$C_{180}/C_0\times100\%$.

(6) Direct Current Resistance (DCR) Increase Ratio Test of Lithium Ion Battery after Cycling and Storage The DCR of the lithium-ion battery was measured as follow: at 25° C., the state of charge (SOC) of the lithium ion battery was adjusted to 20% of the full charge capacity, and then the battery was discharged at a rate of 0.3 C for 10 s. The voltage before the discharge was recorded as $U_1$, the voltage after the discharge was recorded as $U_2$, and thus the initial DCR of the lithium ion battery was $DCR_0=(U_1-U_2)/I$.

Then, according to the above process, the DCR after 1000 cycles at 45° C. and the DCR after storage at 60° C. for 180 days of the lithium ion battery were respectively measured, and the DCR increase ratio of the lithium ion battery was calculated. 15 lithium ion batteries as one group were tested to calculate the average value.

TABLE 4

Measurement results of Embodiments 1-18 and Comparative Examples 1-7

| | $Li_2CO_3$ content/ppm | LiOH content/ppm | Specific surface area m²/g | Expansion ratio after storage at 80° C. for 360 h | Capacity retention ratio after 1000 cycles at 45° C. | DCR increase ratio after 1000 cycles at 45° C. | Capacity retention ratio after storage at 60° C. for 180 days | DCR increase ratio after storage at 60° C. for 180 days |
|---|---|---|---|---|---|---|---|---|
| Embodiment 1 | 2000 | 4000 | 0.60 | 23.5% | 83.6% | 32.4% | 85.6% | 34.1% |
| Embodiment 2 | 2000 | 4000 | 0.65 | 19.6% | 84.2% | 27.8% | 86.1% | 30.4% |
| Embodiment 3 | 2000 | 4000 | 0.60 | 18.7% | 85.3% | 24.0% | 87.4% | 26.7% |
| Embodiment 4 | 2000 | 4000 | 0.62 | 24.3% | 84.7% | 25.6% | 85.1% | 27.3% |
| Embodiment 5 | 2000 | 4000 | 0.58 | 20.8% | 84.9% | 26.3% | 84.5% | 27.9% |
| Embodiment 6 | 2000 | 4000 | 0.59 | 16.9% | 81.3% | 27.6% | 83.2% | 28.1% |
| Embodiment 7 | 2000 | 4000 | 0.61 | 21.7% | 83.5% | 26.7% | 84.6% | 27.4% |
| Embodiment 8 | 2000 | 4000 | 0.63 | 22.5% | 81.0% | 28.4% | 84.2% | 26.4% |
| Embodiment 9 | 1500 | 3000 | 0.81 | 22.0% | 84.6% | 26.3% | 86.4% | 28.4% |
| Embodiment 10 | 1800 | 3500 | 0.72 | 18.7% | 85.4% | 27.9% | 85.6% | 27.2% |
| Embodiment 11 | 2000 | 4000 | 0.55 | 19.4% | 85.1% | 25.5% | 86.1% | 26.3% |
| Embodiment 12 | 2200 | 4200 | 0.54 | 20.9% | 86.2% | 26.1% | 87.2% | 26.7% |
| Embodiment 13 | 2500 | 5000 | 0.54 | 23.7% | 84.3% | 26.2% | 86.0% | 27.0% |
| Embodiment 14 | 1000 | 1500 | 0.64 | 19.6% | 82.9% | 24.7% | 84.3% | 25.4% |
| Embodiment 15 | 1000 | 1500 | 0.86 | 21.5% | 86.2% | 25.8% | 86.7% | 27.1% |
| Embodiment 16 | 1000 | 2000 | 0.68 | 20.8% | 85.3% | 24.9% | 86.0% | 28.2% |
| Embodiment 17 | 2000 | 4000 | 0.60 | 19.1% | 85.3% | 26.1% | 87.9% | 26.3% |
| Embodiment 18 | 2000 | 4000 | 0.60 | 22.6% | 84.4% | 27.0% | 84.5% | 26.0% |

TABLE 4-continued

Measurement results of Embodiments 1-18 and Comparative Examples 1-7

|  | $Li_2CO_3$ content/ppm | LiOH content/ppm | Specific surface area $m^2/g$ | Expansion ratio after storage at 80° C. for 360 h | Capacity retention ratio after 1000 cycles at 45° C. | DCR increase ratio after 1000 cycles at 45° C. | Capacity retention ratio after storage at 60° C. for 180 days | DCR increase ratio after storage at 60° C. for 180 days |
|---|---|---|---|---|---|---|---|---|
| Comparative Example 1 | 5000 | 6000 | 0.30 | 76.5% | 60.3% | 54.3% | 62.9% | 59.4% |
| Comparative Example 2 | 5000 | 6000 | 0.30 | 43.7% | 68.5% | 44.8% | 67.4% | 50.1% |
| Comparative Example 3 | 5000 | 6000 | 0.30 | 52.4% | 70.2% | 41.2% | 76.3% | 45.6% |
| Comparative Example 4 | 5000 | 6000 | 0.30 | 34.5% | 75.4% | 32.3% | 79.4% | 35.6% |
| Comparative Example 5 | 2000 | 4000 | 0.6 | 30.4% | 74.5% | 33.1% | 75.4% | 32.1% |
| Comparative Example 6 | 4000 | 4000 | 0.4 | 35.1% | 73.2% | 34.7% | 77.8% | 36.7% |
| Comparative Example 7 | 4000 | 4000 | 0.4 | 29.7% | 76.4% | 36.4% | 78.4% | 35.1% |

In the embodiments of the present disclosure, the matrix of the positive electrode active material is present in the form of secondary particles formed by agglomeration of primary particles, the first coating treatment is directly performed while the matrix is washed with water, and the nanoparticles of metal element N oxide are attached to the surfaces of primary particles of the outermost layer of the matrix in the form of secondary particles and the surfaces of at least a portion of internal primary particles. As the second coating, a substance having a lower melting point is selected. In this way, during the heat treatment, the first coating layer formed by the nanoparticles of metal element N oxide can be firmly bonded to the matrix, and at the same time, the second coating layer, as a dense and continuous layer, can be formed on the surfaces of primary particles in the outermost layer of the matrix in the form of secondary particles as well as the surfaces of at least a portion of internal primary particles. Therefore, the direct contact between the matrix and the electrolyte can be avoided, the roughness of the surface and the specific surface area of the positive electrode active material can be reduced, thereby improving the stability of the surface structure of the positive electrode active material. In this regard, the positive electrode active material provided by the present disclosure can reduce the effective contact area between the surface of the positive electrode active material and the electrolyte, and thus reduce the side reactions between the surface of the positive electrode active material and the electrolyte, thereby reducing the gas production of the lithium ion battery.

Figure 2:
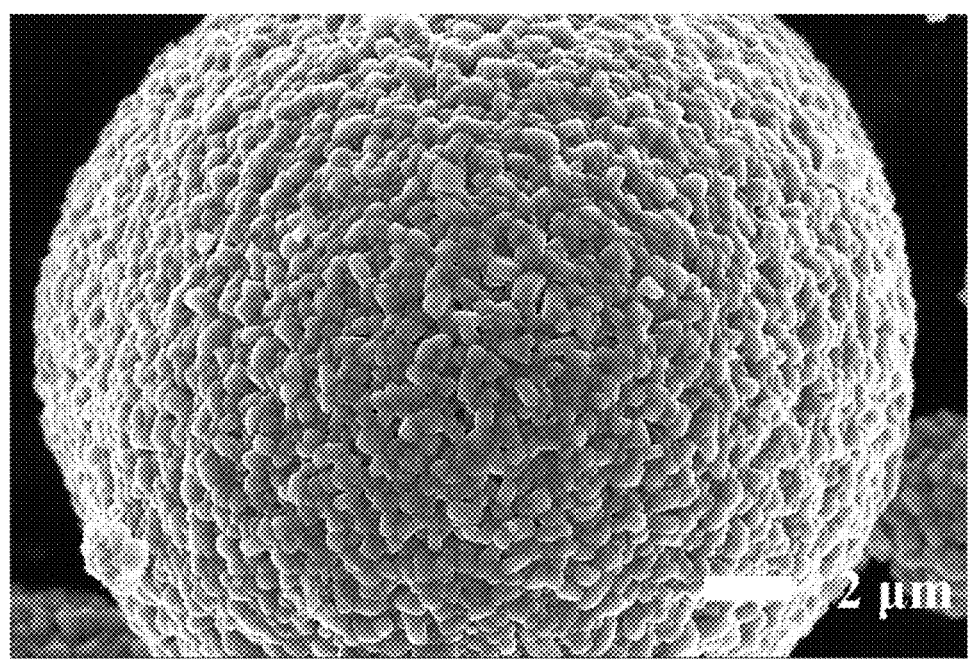

As can be seen from FIG. 1 to FIG. 3, the matrix of the positive electrode active material is present in form of secondary particles formed by agglomeration of primary particles. The first coating layer formed by the nanoparticles of metal element N oxide is coated on the surfaces of the primary particles of the matrix (the white point-like substance shown in FIG. 1) and functions as "nano-nails", and a part of the nanoparticles of metal element N oxide located at the contact position between the primary particles further serves to bond the primary particles together. It can be seen from FIGS. 1 and 2 that a continuous film layer (nearly transparent) is disposed on the surfaces of the primary particles of the outermost layer of the matrix that is in form of agglomerated secondary particles.

In addition, when the cyclic sulfate compound and the lithium difluorobisoxalate phosphate and/or lithium tetrafluorooxalate phosphate are simultaneously added to the electrolyte according to the embodiments of the present disclosure, these additives can cooperatively form a dense and solid composite film on the surface of the positive electrode. The composite film is constituted by the polymer film mainly containing the lithium sulfate salt ($ROSO_3Li$) and the inorganic lithium salt containing the characteristic elements such as P and F. The composite film reduces the oxidation activity of the positive electrode active material, blocks the contact between the positive electrode active material and the electrolyte, and inhibits the oxidative decomposition of the electrolyte, thereby imparting the lithium ion battery with more excellent cycle life and storage life and reducing the gas production. The inorganic lithium salt containing the characteristic elements such as P and F, which is formed through oxidation of the lithium difluorobisoxalate phosphate and/or lithium tetrafluorooxalate phosphate, can modify the protective film on the surface of the positive electrode. In this way, the channels for diffusing lithium ions are maintained to be unimpeded during cycling and storage process. Moreover, the bonding of P in the inorganic lithium salt and O in the positive electrode active material can reduce the oxidation activity of the positive electrode active material and prevent the cyclic sulfate compound from continuously forming the polymer film at the positive electrode interface. Thus, the increase in DCR of the lithium ion battery is significantly suppressed during cycling and storage, and the power performance of the lithium ion battery is improved.

In Comparative Examples 1 to 4, the commercially available lithium nickel cobalt manganese ternary material $LiNi_{0.8}Co_{0.1}Mn_{0.1}O_2$ was used. In Comparative Example 1, none of the cyclic sulfate compound, the lithium difluorobisoxalate phosphate and lithium tetrafluorooxalate phosphate was added, and the lithium ion battery had a large volume expansion ratio after storage at high temperature. In Comparative Example 2, only the cyclic sulfate compound was added, the volume expansion ratio of the lithium ion battery after storage at high temperature was obviously improved, but the DCR increase ratios of the lithium ion battery after cycling and storage at high temperature were great, which can hardly satisfy the requirements in actual applications. In Comparative Example 3, only the lithium difluorobisoxalate phosphate was added, the volume expansion ratio after storage at high temperature of the lithium ion battery was improved insignificantly, and thus also cannot satisfy the requirements in the actual applications. In Comparative Example 4, although both the cyclic sulfate compound and lithium difluorobisoxalate phosphate were added, the lithium ion battery still had a large volume expansion ratio after storage at high temperature, since the commercially available lithium nickel cobalt manganese ternary material has a large specific surface area, a high content of surface residual lithium material and a low stability of surface structure, and thus the battery cannot meet the requirements in the actual applications either.

In Comparative Examples 5 to 7, both the cyclic sulfate compound and lithium difluorobisoxalate phosphate were added. However, since only one coating layer is formed on the surface of the matrix of the positive electrode active material and still has a large specific surface area, the contact area between the surface of the positive electrode active material and the electrolyte fails to be reduced, leading to a relatively great volume expansion ratio of the lithium ion battery after storage at high temperature. In this regard, the battery can hardly meet the requirements in the actual applications.

The above embodiments of the present disclosure are merely preferable embodiments, but not intended to limit the scope of the present disclosure. The changes or modifications made by those skilled in the art without departing from the scope of technical solutions disclosed above should fall into the protection scope of the present disclosure.

What is claimed is:

1. A lithium ion battery, comprising:
a positive electrode plate;
a negative electrode plate;
a separator disposed between the positive electrode plate and the negative electrode plate; and
an electrolyte comprising a lithium salt and an organic solvent,
wherein the positive electrode plate comprises a positive electrode current collector, and a positive electrode film disposed on a surface of the positive electrode current collector and containing a positive electrode active material,
the positive electrode active material comprising:
a matrix having a general formula of $Li_xNi_yCo_zM_kMe_pO_rA_m$, where $0.95 \leq x \leq 1.05$, $0 \leq y \leq 1$, $0 \leq z \leq 1$, $0 \leq k \leq 1$, $0 \leq p \leq 0.1$, $y+z+k+p=1$, $1 \leq r \leq 2$, $0 \leq m \leq 2$, $m+r \leq 2$, M is one or two selected from Mn and Al, Me is selected from a group consisting of Zr, Zn, Cu, Cr, Mg, Fe, V, Ti, Y, Nb, and combinations thereof, and A is selected from a group consisting of N, F, S, Cl, and combinations thereof;
a first coating layer, in form of discrete islands, located on the surface of the matrix, the first coating layer being an oxide of a metal element N, the metal element N being selected from a group consisting of Al, Zr, Mg, Ti, Co, Y, Ba, Cd, and combinations thereof; and
a second coating layer, in form of a continuous layer, located on the first coating layer and the surface of the matrix, the second coating layer being an oxide of an element N', the element N' being selected from a group consisting of B, Sn, S, P, and combinations thereof,
wherein the electrolyte further comprises an additive A and an additive B,
the additive A being selected from a group consisting of cyclic sulfate compounds represented by Formula 1 and Formula 2, and combinations thereof, where in Formula 1 and Formula 2, m is an integer selected from 2 to 3, n is an integer selected from 0 to 3, and $R_1$, $R_2$, $R_3$, $R_4$, $R_5$, $R_6$, $R_7$, and $R_8$ are each independently selected from a group consisting of hydrogen, halogen, cyano, carboxyl, sulfonyl, $C_1$-$C_{20}$ alkyl, $C_1$-$C_{20}$ halogenated alkyl, $C_2$-$C_{20}$ unsaturated hydrocarbyl, and $C_2$-$C_{20}$ halogenated unsaturated hydrocarbyl, and
the additive B being one or two selected from lithium difluorobisoxalate phosphate and lithium tetrafluorooxalate phosphate;

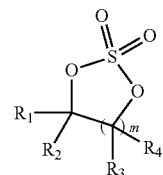

Formula 1

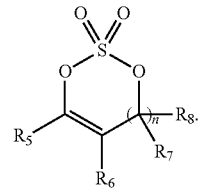

Formula 2

2. The lithium ion battery according to amended claim 1, wherein the positive electrode active material has a specific surface area in a range of 0.3 m²/g to 0.8 m²/g.

3. The lithium ion battery according to amended claim 1, wherein
a content of the metal element N in the first coating layer is in a range of 0.05% to 1% based upon a mass of the matrix, and
a content of the element N' in the second coating layer is in a range of 0.05% to 0.8% based upon the mass of the matrix.

4. The lithium ion battery according to amended claim 1, wherein
the first coating layer further contains Li; and
the second coating layer further contains Li.

5. The lithium ion battery according to amended claim 1, wherein in the matrix, $0.70 \leq y \leq 0.95$, $0 \leq z \leq 0.2$, $0 \leq k \leq 0.2$, $0 \leq p \leq 0.05$, and $y+z+k+p=1$.

6. The lithium ion battery according to amended claim 1, wherein in a residual lithium material on a surface of the positive electrode active material, a content of LiOH is higher than a content of $Li_2CO_3$.

7. The lithium ion battery according to amended claim 1, wherein the additive A is selected from a group consisting of the following compounds, and combinations thereof:

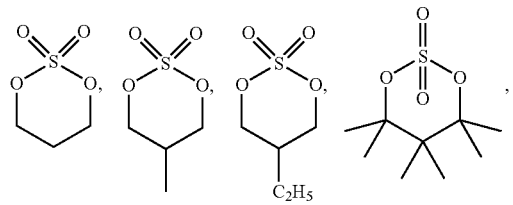

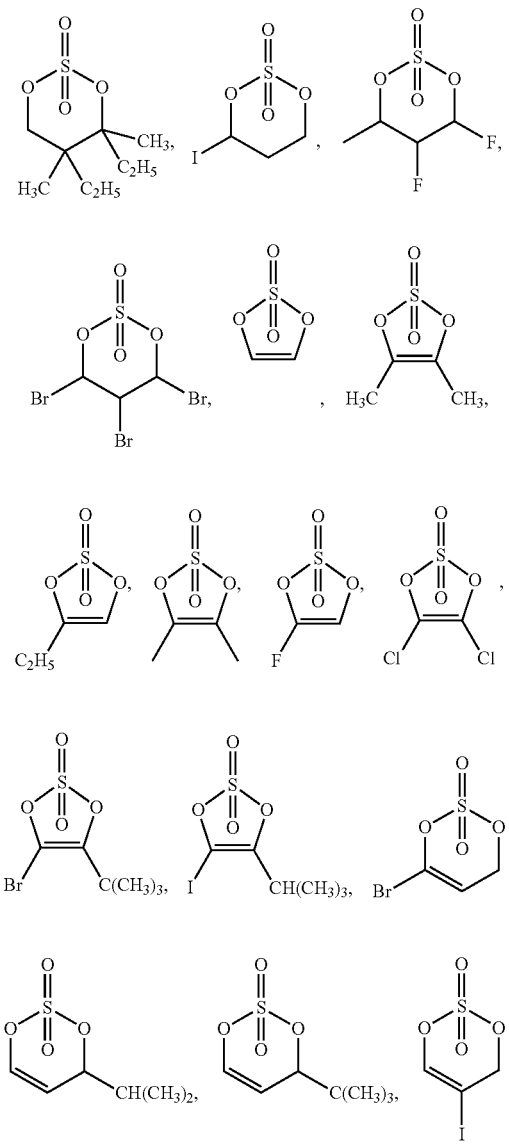

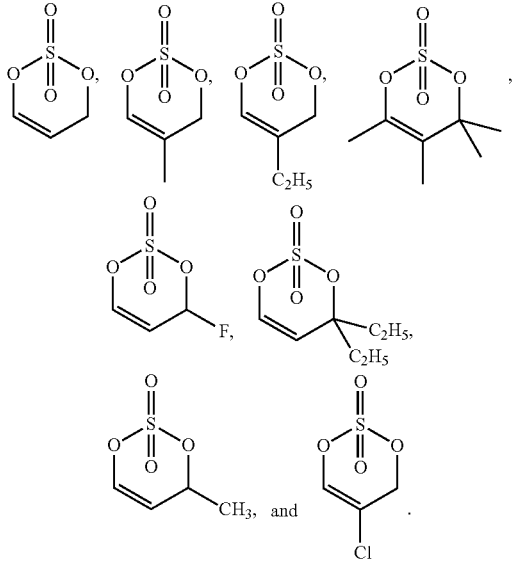

8. The lithium ion battery according to amended claim 1, wherein
a content of the additive A is in a range of 0.01% to 3%, preferably 0.15% to 2.5%, further preferably 0.3% to 2% based upon a total mass of the electrolyte;
a content of the additive B is in a range of 0.01% to 3%, preferably 0.1% to 2%, and further preferably 0.2% to 1% based upon the total mass of the electrolyte.

9. The lithium ion battery according to amended claim 1, wherein the organic solvent is at least two of ethylene carbonate, propylene carbonate, butylene carbonate, ethyl methyl carbonate, dimethyl carbonate, diethyl carbonate, dipropyl carbonate, methyl propyl carbonate, ethyl propyl carbonate, 1,4-butyrolactone, methyl propionate, methyl butyrate, ethyl acetate, ethyl propionate, ethyl butyrate, sulfolane, dimethyl sulfone, methyl ethyl sulfone, and diethyl sulfone.

10. The lithium ion battery according to amended claim 1, wherein the electrolyte further comprises one or more of vinylene carbonate, vinyl ethylene carbonate, fluoroethylene carbonate, succinonitrile, adipicdinitrile, and 1,3-propene-sultone.

\* \* \* \* \*